No. 751,262. PATENTED FEB. 2, 1904.
J. Y. COOPER.
HARROW OR CULTIVATOR TOOTH.
APPLICATION FILED NOV. 5, 1903.
NO MODEL.
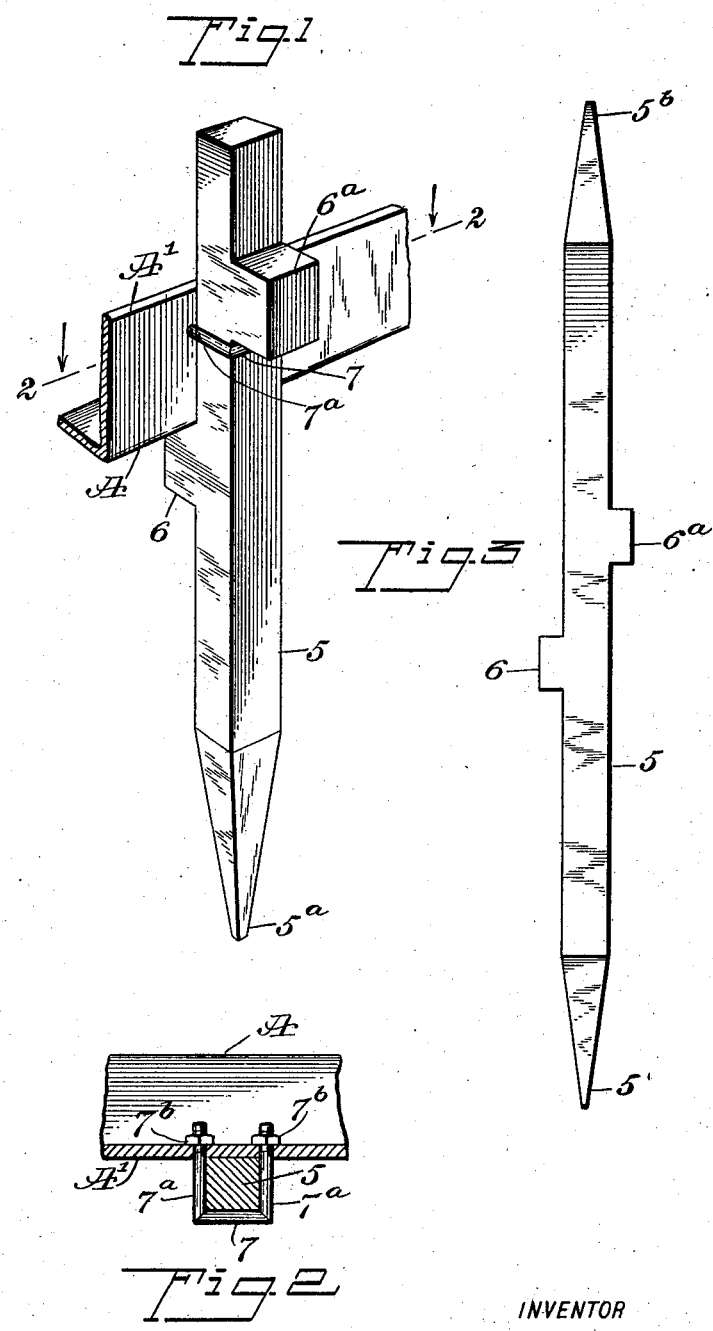
WITNESSES:
INVENTOR
John Y. Cooper
BY
ATTORNEYS No. 751,262. Patented February 2, 1904.

UNITED STATES PATENT OFFICE.

JOHN YOUNG COOPER, OF NASHVILLE, TENNESSEE.

HARROW OR CULTIVATOR TOOTH.

SPECIFICATION forming part of Letters Patent No. 751,262, dated February 2, 1904.

Application filed November 5, 1903. Serial No. 179,946. (No model.)

*To all whom it may concern:*

Be it known that I, JOHN YOUNG COOPER, a citizen of the United States, and a resident of Nashville, in the county of Davidson and State of Tennessee, have invented a new and Improved Harrow or Cultivator Tooth, of which the following is a full, clear, and exact description.

The object of the invention is to provide a tooth of novel construction, which adapts the tooth for convenient attachment upon a frame-beam of a harrow or the frame of a cultivator and prevents the tooth from moving in any direction, but permits it to be readily detached, as occasion may require, a further object being to provide the improved features for a double-pointed tooth, so as to permit the tooth to be reversed in position and substitute a sharp end of the tooth for one that is worn out.

The invention consists in the novel construction of the improved tooth and in its combination with a portion of a harrow-frame or cultivator-frame, as is hereinafter described, and defined in the appended claims.

Reference is to be had to the accompanying drawings, forming a part of this specification, in which similar characters of reference indicate corresponding parts in all the figures.

Figure 1 is a perspective view of the invention applied upon a single-pointed tooth and showing the improved means for holding the tooth on a harrow-beam. Fig. 2 is a transverse sectional view substantially on the line 2 2 in Fig. 1, and Fig. 3 is a side view of a double-pointed tooth having the improvements.

The body portion 5 of the tooth is formed of a metal bar rectangular in cross-section and having a sufficient length for effective service. The tooth-body may be entirely of steel or have a steel point formed either on one end, as shown at $5^a$ in Fig. 1, or on both ends, as represented in Fig. 3 at $5^a$ $5^b$.

The improved tooth in proper number is designed especially for attachment upon the frame members of a harrow of any desired size, and it is particularly well adapted for a removable connection with metal frame-beams formed of angle-iron material, and the improvement is shown as attached to such a harrow member A in the drawings.

The tooth-body 5 is formed with two lugs or lateral projections 6 $6^a$ that are rectangular in cross-section and are positioned upon opposite sides of the tooth-body. The upper and lower sides of the lugs 6 $6^a$ are parallel with each other and at right angles to the sides of the tooth-body. The lugs 6 $6^a$ are spaced apart from each other at a proper distance, and in case the tooth is pointed on each end, as represented at $5^a$ $5^b$ in Fig. 3, the lugs 6 $6^a$ are preferably located an equal distance from the respective points $5^a$ $5^b$.

The improved teeth are of course positioned on the frame of the harrow at suitable distances apart, and each tooth is removably but firmly secured upon the angle-iron beams, such as A, by the following-described means: In the upright member A' of the beam A two perforations are formed in a plane parallel to the upper edge and lower face of the beam and at a distance from said lower face equal to the space between the lugs 6 $6^a$. A looped clamp is provided, comprising two parallel bolt-like members $7^a$, that are spaced apart by an integral transverse member 7 and are threaded on their free ends, and on said ends the tapped nuts $7^b$ are screwed when the clamp is adjusted. The limbs or members $7^a$ are so spaced apart by the cross-bar 7 that they will closely embrace the body of the tooth when placed thereover, and the perforations in the upright flange on the angle-beam A are equally spaced apart with said limbs $7^a$, so that the latter may be passed through them and fit therein. To mount the tooth upon the beam A, as shown in Figs. 1 and 2, the lug 6 nearest to the depending point $5^a$ of the tooth is caused to engage with the upper side upon the lower horizontal surface of the angle-beam, which will dispose the tooth-body in a vertical plane, as the engaged surface of the lug is at a right angle to the longitudinal axis of the tooth. As the lug $6^a$ is so relatively positioned that the lower surface thereof is about level with the upper sides of the perforations in the upright flange on the angle-beam A, it will be seen that the looped clamp having the limbs $7^a$ may be placed in position by causing said limbs to embrace the tooth-body 5 and have the transverse member 7 in close contact with the lower surface of the lug 6$^a$, at the same time passing the threaded end portions of the limbs 7$^a$ through the perforations in the harrow-beam A. The nuts 7$^b$ are now screwed upon the threaded end portions of the clamp-limbs 7$^a$ and drawn tightly against the angle-beam, which will hug the looped clamp close to the lower surface of the lug 6$^a$ and at the same time draw the upper face of the lug 6 against the horizontal member of the angle-beam A. It will be seen that by the provision of the spaced lugs 6 6$^a$ on opposite sides of the tooth-body 5 and the employment of the looped clamp, as described, the harrow-teeth may be quickly and reliably secured in place and be immovably held on the harrow-beams until designedly detached therefrom. It will also be evident that the tooth is reversible and that if turned end for end the lugs will be correspondingly reversed in position, the lug 6$^a$ then becoming lowermost and thus adapted to seat against the lower surface of the angle-beam A, while the other lug, 6, is engaged with the looped clamp, and the latter, by adjustment of the nuts 7$^b$ thereon, after the limbs 7$^a$ are inserted through the perforations in the angle-beam, serves to clamp the tooth in place and hold it securely, as before explained.

While the preferred use of the invention is its application to harrows, it is to be understood that the improved teeth in sufficient number may be employed as details of a cultivator having metal or other frame-beams whereon the teeth may be secured similarly to their manner of connection with harrow-frame beams, as hereinbefore explained.

Having thus described my invention, I claim as new and desire to secure by Letters Patent—

1. A harrow-tooth rectangular in its body, and provided with spaced lugs on opposite sides thereof at a proper distance from the point of the tooth.

2. A harrow-tooth having a body rectangular in cross-section, a point at each end, and spaced lugs on opposite sides of the body between the pointed ends.

3. The combination with an angle-beam for a harrow, having spaced perforations in its upright member, of a rectangular-bodied tooth, having spaced lugs on opposite sides, and a looped clamp having threaded ends and nuts thereon, said clamp engaging the tooth-body below and in contact with one lug, and passing through the perforations in the beam, the nuts when adjusted on the clamp drawing the lower lug on the tooth against the lower horizontal surface on the angle-beam.

In testimony whereof I have signed my name to this specification in the presence of two subscribing witnesses.

JOHN YOUNG COOPER.

Witnesses:
N. P. YEATMAN,
C. A. GENNUG.